United States Patent [19]
Samole

[11] Patent Number: 6,056,554
[45] Date of Patent: May 2, 2000

[54] APPARATUS AND METHOD FOR FINDING AND IDENTIFYING NIGHTTIME SKY OBJECTS

[76] Inventor: Sidney Samole, 6755 SW. 152nd St., Miami, Fla. 33157

[21] Appl. No.: 09/149,939

[22] Filed: Sep. 9, 1998

[51] Int. Cl.$^7$ .................................................. G09B 27/04
[52] U.S. Cl. .............................. 434/289; 434/284; 345/7; 340/286.14
[58] Field of Search ................................ 434/289, 284, 434/276, 304; 345/7, 8; 340/286.14, 990, 995; 33/268

[56] References Cited

U.S. PATENT DOCUMENTS

| | | | |
|---|---|---|---|
| 2,508,027 | 5/1950 | Hoffmeister | 33/1 SA |
| 3,037,284 | 6/1962 | Wagoner | 33/1 SA |
| 3,041,742 | 7/1962 | Meisenheimer | 434/289 |
| 3,051,036 | 8/1962 | Zone | 359/880 |
| 3,194,949 | 7/1965 | Jasperson | 701/22 |
| 4,851,775 | 7/1989 | Hawks et al. . | |
| 5,239,264 | 8/1993 | Hawks . | |
| 5,274,926 | 1/1994 | Dillon | 33/273 |
| 5,311,203 | 5/1994 | Norton | 345/7 |
| 5,704,653 | 1/1998 | Lee . | |

*Primary Examiner*—Robert A. Hafer
*Assistant Examiner*—Bena B. Miller
*Attorney, Agent, or Firm*—Richard M. Saccocio

[57] ABSTRACT

Apparatus and methods for finding and identifying objects in a nighttime sky include a lighted map arrangement, an electronic compass, and means to operate and view the apparatus in the dark to either find the objective in the nighttime sky or to identify an object observed in the nighttime sky. The apparatus and methods provide for orientation as to the physical geographical location of the viewer and the current date and time, as well as orientation of the viewing apparatus relative to the viewer and the nighttime sky.

17 Claims, 3 Drawing Sheets

APPARATUS AND METHOD FOR FINDING AND IDENTIFYING NIGHTTIME SKY OBJECTS

BACKGROUND OF THE INVENTION

1. Field of the Invention

This invention relates in general to the field of astronomy and in particular to the field of locating and identifying stars, planets, and constellations by electronic means.

2. Description of the Prior Art

Star gazing by non-professionals is an everyday occurrence. The nighttime sky is not only a thing of spectacular beauty, it holds the secrets to life itself. It is inconceivable that a person can look up into the nighttime sky and not shake his or her head in amazement. On a dark night, the view is without equal—it is truly galactic.

Unfortunately, most persons who view the heavens at nighttime simply do not know what they are seeing. The average person cannot locate the planets nor the constellations. Some of the more fortunate few can identify and locate some of the more common stars, or planets, or constellations, such as the North Star, Mars, and the small and big dippers. To most persons, however, the sky is an unknown, albeit a spectacular unknown.

A general approach to understanding what a person is seeing when he or she views the nighttime sky is to obtain a basic book on the stars. Then, if he or she can orient himself with relation to the sky and the illustrations in the book, he or she might be able to locate and identify particular stars, planets, and even constellations. "Might" is the key word because the average person, as hard as he or she may try, will often fail to identify and locate particular heavenly bodies. Even if successful, the average person will probably still be uncertain that he or she has actually found and is viewing the particular body sought. One of the problems being the varying location of the heavenly bodies at any particular time of day, or year. The location of some stars and constellations vary greatly over time, others not so much, and even others hardly at all. Another variable is the location of the star gazer. A view from Greenland is vastly different from the view at Panama, even on the same day and at the same time. When different seasons of the year are added to the situation, the identification and location process becomes extremely difficult. The nighttime sky is simply to vast and too variable for the average person.

To help in overcoming the problems associated with nighttime viewing of the sky, one prior art system utilized sky maps in conjunction with charts or tables having coordinates corresponding to times and date. Other coordinates were used to orient the sky map with the sky itself and where the viewer should be looking, for example, directly overhead. Of course, further coordinates are necessary to account for the viewers latitude and longitude. This art is exemplified in U.S. Pat. No. 5,704,653, issued Jan. 6, 1998 by Samuel lee. While such a system is helpful, there are limitations such as the viewer's innate ability to accomplish the various tasks, as well as the need to manipulate the various charts and tables in the dark and without the aid of a work surface.

All in all, the prior art methods and apparatus whereby a star gazer can identify and locate stars or constellations are of little and questionable value to the average person.

Accordingly, the primary object of the present invention is to provide electronic apparatus and methods for use by an average person so as to enable the average person to easily and quickly identify and locate stars, planets, and constellations at any time of the day or year and regardless of his or her geographical location.

Another object of the present invention is to provide electronic apparatus and methods for use by an average person whereby the average person may easily and quickly determine the identity of a particular star, plant, or constellation.

The above-stated objects as well as other objects which, although not specifically stated, but are intended to be included within the scope of the present invention, are accomplished by the present invention and will become apparent from the hereinafter set forth Detailed Description of the Invention, Drawings, and the Claims appended herewith.

SUMMARY OF THE INVENTION

The present invention accomplishes the above-stated objectives as well as others, as may be determined by a reasonable interpretation of the herein enclosed specification, including the drawings and the claims appended hereto.

For purposes of brevity, the present invention will be characterized as a night navigator. The night navigator comprises hand held electronic apparatus which includes an electronic compass, a microprocessor, a motorized map delivery arrangement and a control panel. The electronic compass provides for precise orientation of a viewer's geographical location and the night navigator's orientation during viewing. The microprocessor provides for the time, date, and seasonable variables. The motorized map delivery system provides for illustrating on the screen of the night navigator a sky map corresponding to the actual sky at the time, date, season, and geographical location of the viewer.

The night navigator provides two modes of operation. One is to allow a viewer to select a particular star, planet, or constellation which he or she desires to view and then allows the viewer to actually view the selection in the nighttime sky. The other mode of operation allows a viewer to select a particular star, planet, or constellation in the nighttime sky and then provides for an identification of the selection. During either mode of operation, the unique features of the night navigator provide fro tracking the movement of the nighttime sky it changes with time.

BRIEF DESCRIPTION OF THE DRAWINGS

Various other objects, advantages, and features of the invention will become apparent to those skilled in the art from the following discussion taken in conjunction with the following drawings, in which:

FIG. 3 is a side view of the embodiment depicted in FIG. 1; and

DESCRIPTION OF THE PREFERRED EMBODIMENTS

Figure 1:
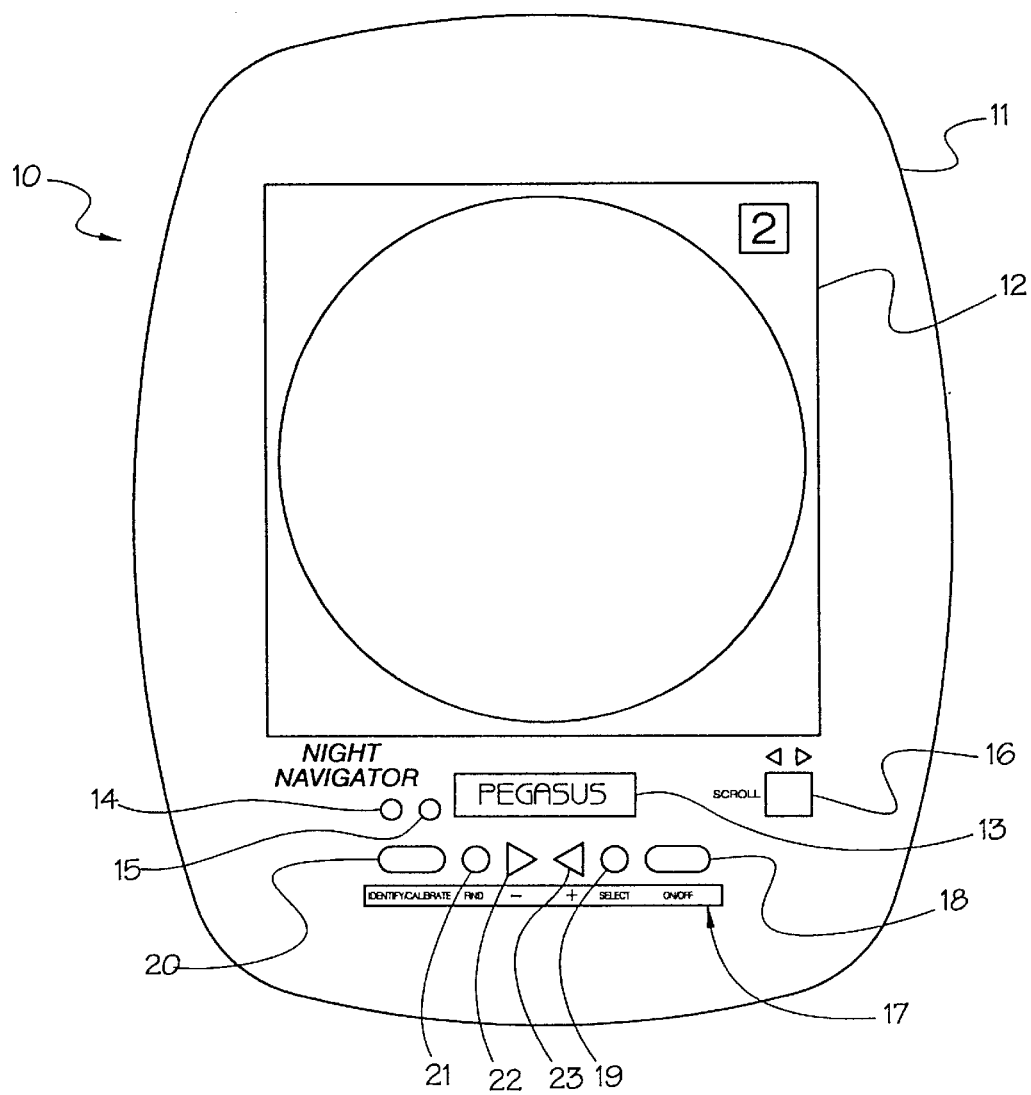
FIG. 1 is a top plan view of one embodiment of the inventive apparatus.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various figures are designated by the same reference numerals.

FIG. 1 depicts one embodiment of the inventive apparatus 10 which, as stated above, is characterized as night navigator. FIG. 1 illustrates a top plan view thereof. A housing 11 is utilized to contain the various components and the operative controls of the night navigator. On the top portion of the housing 11 is included a screen member 12, a selection display member 13, colored liquid crystal lights(LCDs) 14 and 15, respectively, a scroll switch 16, and a control panel 17. The control panel 17 includes an on/off key 18, a select key 19, an identify/calibrate switch 20, a find key 21, and increase 22 and decrease 23 keys. The keys, of course, operate in conjunction with electronic switches which are operatively connected to the night navigator within the electronics thereof.

The screen member 12 is relatively large so as to provide a viewer with a screen that is readily viewable with the naked eye or the corrected vision of the viewer. Screen member 12 may consist of a transparent plastic material hermetically sealed and connected to the housing 11. The display member 13, via LCDs, provides the viewer with information and instructions in accordance with the operation of the night navigator. The display member 13 may, for example, provide the viewer with instructions to allow the initial setup of the night navigator. Or, the display member 13 provides for the viewer to input his requests or instructions to the night navigator. In essence, the display member provides a means fro the viewer to talk to the night navigator and vice versa, depending upon the mode of operation that is then in use.

Subsequent to the initial setup or calibration of the night navigator, the night navigator provides for two modes of operation. One is to allow a viewer to view a particular star, planet, or constellation that the viewer desires to see in the nighttime sky. For example, the viewer might desire to view the Scorpio constellation. The night navigator will provide the viewer with the means to locate and view that constellation in the nighttime sky, taking into consideration the viewer's geographical location and the then time and date.

The other mode of operation is to provide a viewer with the means to identify a particular star, planet, or constellation that the viewer sees in the nighttime sky. For example, a viewer might look at the nighttime sky and observe a particularly bright star. He does not, however, know the name of that star. The night navigator will allow him to learn or determine the identify of that star.

Figure 2:
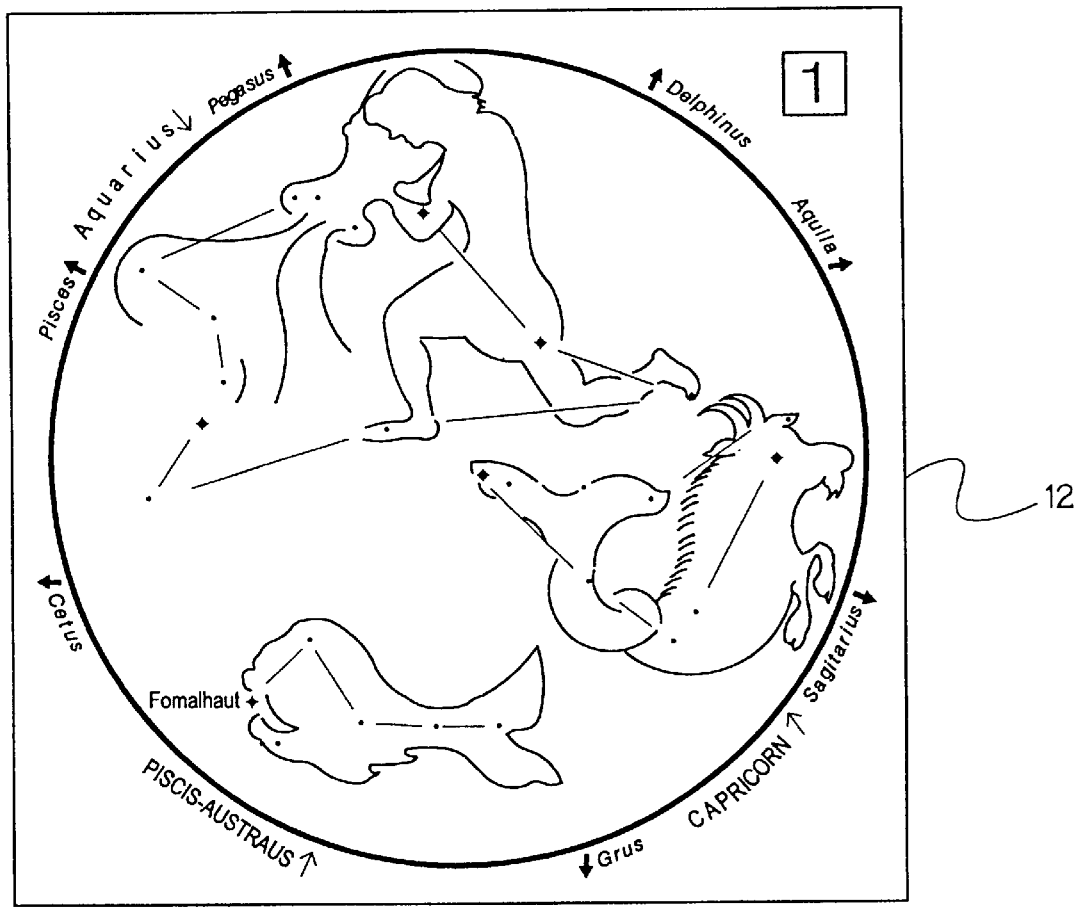
FIG. 2 is a typical view of a sky map as it appears on the screen of the inventive apparatus.

FIG. 2 is one example of a view as seen by the viewer on the screen member 12 of the night navigator. The viewer observes that the number of the sky map being shown is 'number 1.' The 'number 1' is silk-screened thereon, using, for example, the color red. Moreover, the number is translucent, such that it is lighted by a light source which is located under or behind the sky map. In other words, the screen is back lighted. Also on the map are silk-screened particular stars which make up particular constellations. The outline of the constellations are also silk-screened on the sky map, but using a different color, for example, blue. The stars making up the constellations are again illuminated in red. Illuminated lines between the stars allow the viewer to follow the line of the stars which make up the constellations. An illuminated circle is used to "contain" or isolate the portion of the nighttime sky being shown on the sky map. The same helps the viewer in associating the sky map with a particular portion of the nighttime sky.

Figure 4:
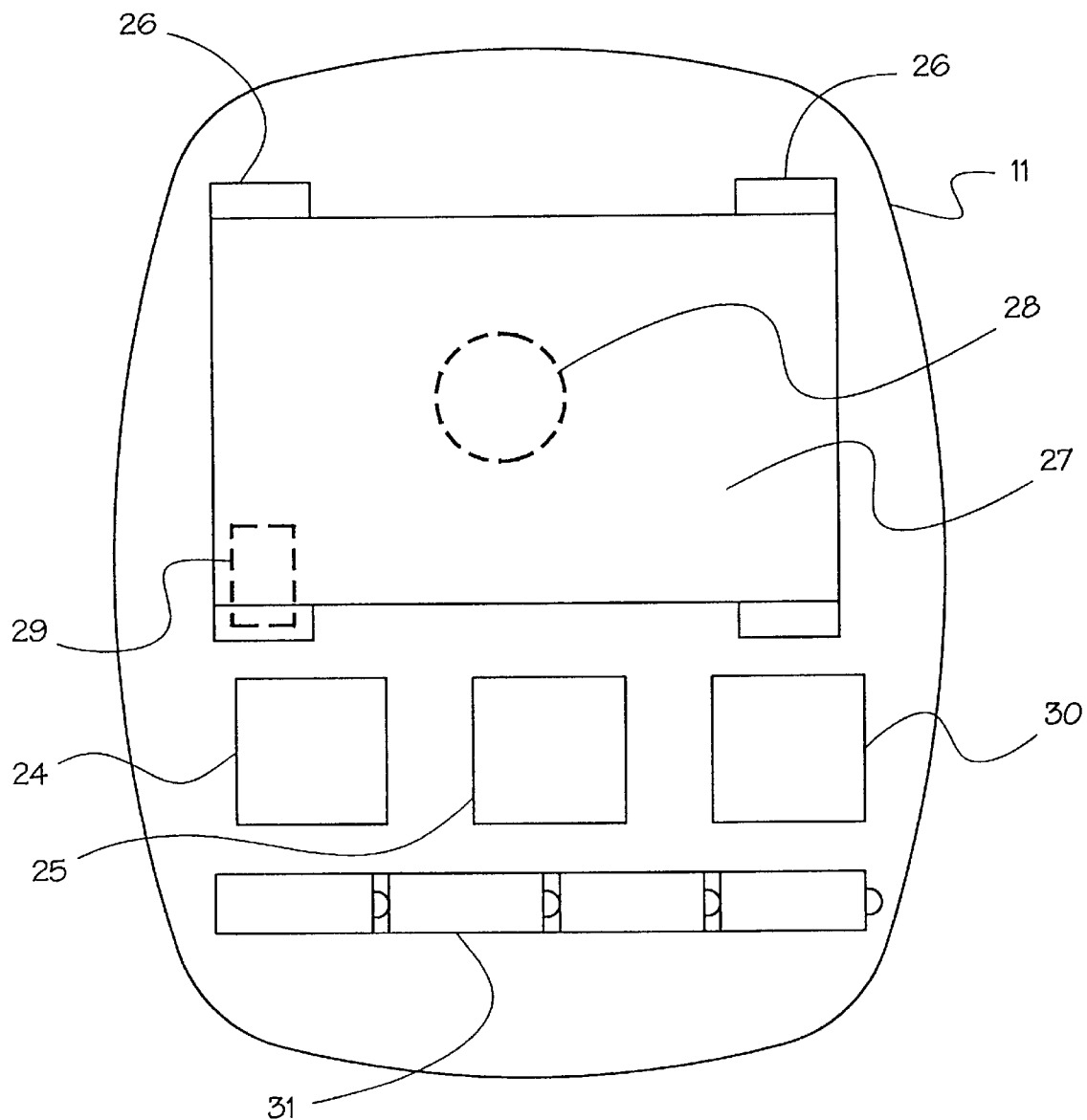
FIG. 4 is a cross-sectional view of the embodiment of FIG. 1 taken along the line 4—4 of FIG. 3 which schematically illustrates the major components.

FIGS. 3 and 4 schematically show the arrangement of the main components of the night navigator within the housing 11. An electronic compass and magnetic sensor module 24 is used to orient the night navigator 10 with regard to the nighttime sky relative to the physical location and orientation of the viewer. Compass module 24 may comprise the Vector 2x model produced by Precision Navigation, Inc. of California. A programmable microprocessor 25 is operatively connected to compass module 24.

A motorized scrolling map arrangement provides the viewer with a plurality of sky maps which, taken together, illustrate substantially the entire nighttime sky. The map arrangement includes a pair of reels or rollers 26 located on opposite sides of the housing 11. The maps are contained on a single piece of flexible material 27 which is wound around the rollers 26 and a portion of which is tautly held between the rollers 26. By scrolling the flexible material 27 in either direction, a different nighttime sky map will be positioned under the screen member 12. The maps themselves, as stated above, are silk-screened onto the flexible material 27 using a red color to depict a star or planet, and a blue color to show the outline of the constellations. A light source 28 within the housing 11 and under the map provides for a back-lighted view of the stars and constellations on the viewing screen 12 which, of course, allows for viewing in the dark. A DC motor 29 may be used to rotate the rollers so as to scroll the maps under the screen as directed by the microprocessor and/or the viewer by activating the scroll switch 16.

An electronic circuit board 30 appropriately wired is used to operatively connect the compass module 22, the microprocessor 25, the motorized scrolling map arrangement, and the switches on the control panel. A battery power source 31 is used to provide electric power to operate the night navigator.

The first step in initially using the night navigator to calibrate the night navigator such that it becomes knowledgeable of the viewer's geographic location and the current time and date. This procedure can be accomplished very conveniently in daylight or a lighted room while seated at a desk or table. Upon turning the night navigator on for the first time, the display member 13 will display 'SET-UP' on its screen. The night navigator will then request that the current time and date be input. This will be accomplished by using the increase and decrease keys 22 and 23 in conjunction with the select key 19 when the correct information is input. In this manner, the AM or PM, the hour, the minute, the month, the day, and the year are recorded in the microprocessor 23.

The next step is to input the viewer's latitude and longitude. If the viewer is unaware of his latitude, latitude maps are provided with the unit from which the viewer can ascertain his latitude. Since the calibration procedure can be accomplished in daylight or in a light room while seated at a desk or table, the ability to use a lighted work surface makes the need to use the maps a simple task. The correct latitude is input using the increase 22, decrease 23, and select 19 keys. Then, the viewer inputs his or her longitude. This is done by inputting the viewer's world time zone which can be ascertained from the maps provided to the viewer. The night navigator even provides for inputting daylight savings time, if applicable. The night navigator will then display 'READY' on the display screen, meaning, of course, that the unit is calibrated as to location and time and is ready to be put to use.

Should the viewer need to adjust or correct the setup settings, he or she need only to push the find key 21 until the SET-UP display is again shown and then proceed to make the correction or adjustment. The SET-UP procedure is exited at any time by again pressing the find key 21. The calibration does not need to be reset at any time thereafter unless the viewer changes his geographical location of if daylight savings time changes.

To use the night navigator, the viewer does not need to again refer to the latitude and longitude maps. These can be left in storage along with the packaging of the night navigator. Thus, all that the viewer needs to manipulate during his night time viewing is the night navigator itself. This feature immensely simplifies the viewing procedure.

To use the night navigator, the viewer presses the 'ON' key 18 and presses the find key 21 until the display screen 13 displays the type of object the viewer wants to find and view, for example, stars, planets, or constellations. If the viewer chooses constellations, he or she then presses the increase key 22 until the particular constellation appears on the display screen 13. The display screen will also display the map number of the constellation. Then, the scroll key 16 is pushed until that numbered sky map is shown on the screen 12. The select key 19 is pressed to confirm the choice of the constellation.

The display screen will then instruct the user to turn his body to face the correct direction which is indicated by one of the LCD lights 14. The night navigator itself is then rotated until the second LDC light 15 is illuminated. At this time, the viewer and the night navigator are properly oriented to the viewer's view of the nighttime sky which contains the constellation desired to be viewed. The display screen 13 will then instruct the viewer to look to 'LOW,' 'MID' or 'HIGH' in the sky. The viewer raises the night navigator directly under his or her line of sight, be it low, mid, or high. He then compares the illuminated constellation on the screen 12 with the stars in the sky to locate the actual constellation. Then to better learn the key and to view additional objects, the viewer uses the screen 12 and his or her orientation to view neighboring stars, planets, or constellations which are identified and illuminated on the screen 12. Should this simple procedure prove to be difficult for a small child, an adult can perform the body and night navigator orientation while standing behind the child. In this manner, small children can be introduced to stargazing and learn astronomy at a very young age. To use the night navigator in its other mode of operation, that is, to identify a particular star, planet, or constellation that the viewer sees in the sky, the find key 21 is pressed until the display screen 13 displays 'READY.' The viewer's body is turned to face the object to be identified at which time the identify key 20 is pressed. The display screen will inform the viewer the map number which contains that object. The scroll key is pressed to align the map with the screen 12. The night navigator is held directly under the viewer's line of site enabling the viewer to compare the object with the map and identify the same. Should the viewer be facing away from the center of the map on the screen 12, the display 13 instructs the viewer to turn to the left or right. Should the night navigator need to be rotated, the display will so indicate. When the exact position is attained by the viewer both LCDs 14 and 15 will be illuminated.

Since the night navigator has been calibrated in accordance with the current time, the "movement" of the nighttime sky is eliminated as a variable. To put it another way, the night navigator actually tracks the movement of the nighttime sky. A viewer is, therefore, not faced with a need to view the sky at a particular time in order to view the object he or she chooses.

Because the night navigator includes an electronic compass, the same may be used to accurately determine the viewer's direction or direction he or she wishes to travel. And, since the night navigator has been adjusted or calibrated to the viewer's magnetic variation, the compass is much more accurate than a standard magnetic compass. To use the compass feature, the unit is turned on and a three-digit number appears at the top of the display screen 13. The number indicates the number of degrees away from true north in a clockwise direction. If the viewer wishes to travel east, he or she aligns his direction and the night navigator until the number 045 appears on the display screen 13. He or she then proceeds in that direction.

In accordance with the above, there is disclosed methods and apparatus for either locating a particular star, planet, or constellation in the actual nighttime sky or for identifying an object observed in the actual nighttime sky—in the dark and without the need to use any extraneous charts, maps, devices, etc. The viewing apparatus is completely self-contained and is portable. The viewing apparatus needs to be calibrated only once as to the viewer's geographical location and the current date and time.

While the invention has been described, disclosed, illustrated and shown in certain terms or certain embodiments or modifications which it has assumed in practice, the scope of the invention is not intended to be nor should it be deemed to be limited thereby and such other modifications or embodiments as may be suggested by the teachings herein are particularly reserved especially as they fall within the breadth and scope of the claims here appended.

I claim:

1. Nighttime sky viewing apparatus adapted to identify and locate stars, planets, and constellations comprising:

a housing;

a power source within said housing;

an electronic compass within said housing;

a motorized map arrangement within said housing;

said motorized map arrangement comprising a plurality of individual maps arranged side by side on an elongated flexible film;

a screen member for viewing said motorized map arrangement;

a display member for viewing and receiving information;

and controls for inputting and receiving information.

2. The apparatus of claim 1, wherein said motorized map arrangement includes a pair of spaced rollers, one being positioned at one side of said screen member and the other being positioned at an opposite side of said screen member, said flexible film being wound around said rollers and extending therebetween.

3. The apparatus of claim 2, including a motor operatively connected to said pair of rollers whereby operation of said motor winds said flexible film onto one roller while unwinding said flexible film from said other roller.

4. The apparatus of claim 3, wherein said plurality of maps on said flexible film each contain a portion of sky showing corresponding stars, planets, and constellations thereon.

5. The apparatus of claim 4, wherein said maps are configured to be back lighted for nighttime viewing.

6. The apparatus of claim 4, wherein said maps are scrolled in either direction in accordance with said controls for inputting or receiving information.

7. The apparatus of claim 1, wherein said controls include apparatus for inputting latitude and longitude information.

8. The apparatus of claim 7, wherein said electronic compass is operatively connected to said latitude and longitude information inputting apparatus whereby said nighttime sky viewing apparatus is oriented to an input latitude and longitude.

9. The apparatus of claim 1, wherein said controls include apparatus for inputting a date and time.

10. The apparatus of claim 1, wherein said controls include a find key which is operatively connected to a storage module and said display member, said storage module containing names of stars, planets and constellations which are displayable on said display member.

11. The apparatus of claim 10, wherein said controls include a select key operatively connected to said storage module and said display member.

12. The apparatus of claim 1, wherein said controls include an identify key which is operatively connected to said storage module and said display member.

13. A method for a person to find objects in a nighttime sky using a nighttime sky viewing apparatus comprising the steps of:

inputting the current time and date into said nighttime sky viewing apparatus;

inputting the person's geographical location comprising the person's latitude and longitude into said nighttime sky viewing apparatus;

selecting the object to be found in the nighttime sky by selecting said object from an information storage module within said nighttime sky viewing apparatus whereby information regarding said object appears on a display member;

using said information displayed regarding said object to scroll a motorized nighttime sky map arrangement until a map displaying said object appears on a viewing screen;

orienting the nighttime viewing apparatus in the direction of said object by turning the nighttime sky viewing apparatus about a vertical centerline through the person's body;

orienting the displayed map to the person's view of the nighttime sky by rotating the nighttime sky viewing apparatus in a horizontal plane about its own vertical centerline; and locating said object in the nighttime sky by comparing said object shown on said viewing screen with the nighttime sky.

14. The method of claim 13, including the steps of:

raising the nighttime sky viewing apparatus to a height position relative to the nighttime sky as indicated by said nighttime sky viewing apparatus.

15. A method for a person to identify an object in the nighttime sky by using a nighttime sky viewing apparatus comprising the steps of:

calibrating said viewing apparatus to the viewer's physical geographical location and the current date and time;

turning the person's body in a direction facing the object to be identified;

pressing an identify key on said nighttime viewing apparatus whereby a display member indicates said object and a map containing said object;

scrolling a nighttime sky map arrangement until said indicated map appears on a viewing screen;

rotating said nighttime viewing apparatus about its own vertical axis to be position indicated by said nighttime viewing apparatus; and locating said object on said viewing screen by visually comparing the nighttime sky to the map displayed on said viewing screen.

16. The method of claim 15, including the step of adjusting the person's viewing direction to a center of said indicated map as indicated by said viewing apparatus.

17. The method of claim 15, including the step of raising the nighttime sky viewing apparatus to a height position relative to the nighttime sky as indicated by said viewing apparatus.

* * * * *